March 2, 1926.

W. T. HOFMANN

PROCESS FOR PRODUCING A WATERPROOF SHEETED
SUBSTANCE AND PRODUCT PRODUCED THEREBY

Filed March 17, 1922

1,574,890

Witness:

Inventor:
William T. Hofmann.

Patented Mar. 2, 1926.

1,574,890

UNITED STATES PATENT OFFICE.

WILLIAM T. HOFMANN, OF CHICAGO, ILLINOIS, ASSIGNOR TO BECKMAN-DAWSON ROOFING COMPANY, OF CHICAGO, ILLINOIS, A CORPORATION OF ILLINOIS.

PROCESS FOR PRODUCING A WATERPROOF SHEETED SUBSTANCE AND PRODUCT PRODUCED THEREBY.

Application filed March 17, 1922. Serial No. 544,594.

*To all whom it may concern:*

Be it known that I, WILLIAM T. HOF-MANN, a citizen of the United States, residing in the city of Chicago, county of Cook, and State of Illinois, have invented certain new and useful Improvements in Processes for Producing a Waterproof Sheeted Substance and Product Produced Thereby, of which the following is a specification.

This invention relates to a process and apparatus for producing a waterproof sheeted substance and refers more particularly to a process for producing sheeted siding or sheeting material used by the building trades.

Among the objects of the invention are to provide a process for producing a sheeted material which may be used as a siding for dwellings in place of lath for interior construction and for numerous other uses where a waterproof sheeted material having a rough surfacing layer may be employed.

Figure 1:
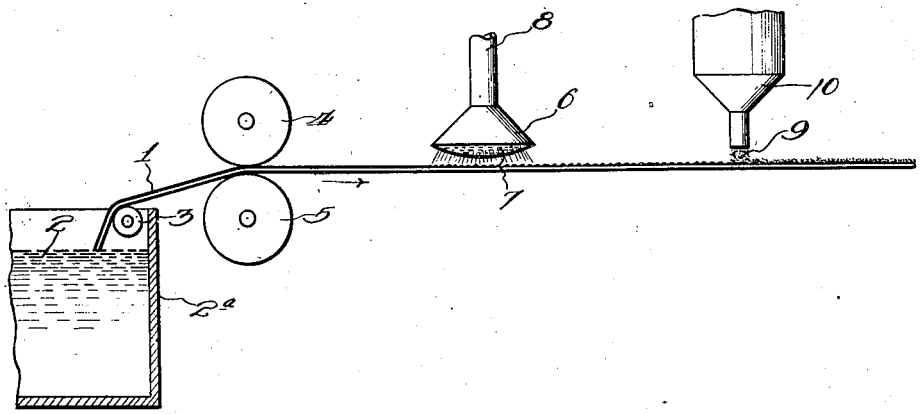
Fig. 1 is a diagrammatic side elevational view of the apparatus.

Referring to the details of the drawings, a felted fibrous base 1, such as commonly used in the prepared roofing industry, is saturated and coated with a coating substance 2 contained in a tank 2ª. The sheet after being coated in the saturating tank, is passed over roll 3 and between the pressure roll 4 and bed roll 5 where the coating substance is evenly distributed over the sheet. The coated sheet with the viscous waterproofing substance still in a semi-solid or plastic state, is passed over a blower comprising a wide nozzle or shower 6 which has a plurality of small holes 7 in the bottom thereof, through which an air blast under high pressure delivered to the shower through the line 8 is blown directly onto the surface of the sheet. One or more of these blast nozzles will be positioned over the sheet according to its width. The air blast blowing directly upon the viscous coating substance produces an irregular surface with innumerable furrows and upstanding portions which set simultaneously with their forming due to the cooling effect of the air blast. Onto this jagged, coarsely denticulated surface is applied a granular surfacing material of coarse grit 9 by means of a hopper 10, which may be rolled to produce a flat surface or may be left in an irregular state and stucco or cement applied thereto. In using the material for siding, where stucco or a cementitious substance is to be applied, the coarse, irregular, conglomerate or heavy grit surfacing applied to the irregular coating may be left in its irregular form and the cement or stucco coating applied directly thereto. In a similar manner the blast may be applied when the sheet is to be used for interior work in the place of wood or metal lath.

Figure 2:
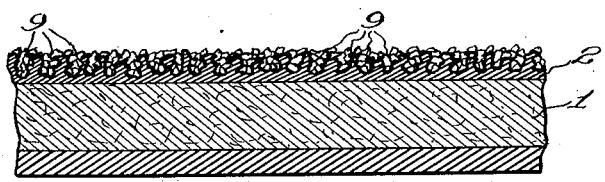
Fig. 2 is a sectional view of the finished sheet with the material surfaced with a coarse grit.
Figure 3:
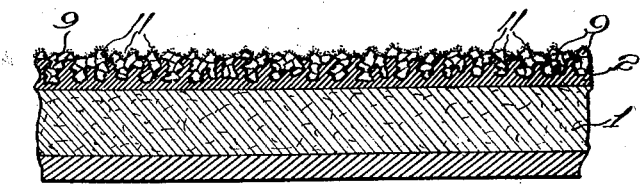
Fig. 3 shows a sectional view of the material having a finer coating of cement or stucco imposed upon the coarse grit.

In Figs. 2 and 3 at 1 is shown the base or felted fibrous material 1 which is coated with a waterproofing substance 2. Filling the uneven surface of the coating substance is a coarse grit 9. In Fig. 2 the coarse grit is left intact and produces a rough uneven surface. In Fig. 3 this coarse surface has been finished with stucco or cement as shown at 11.

The fact that the surfacing material is underlaid with a waterproofing substance prevents the cracking due to the inroads of moisture and the flexible character of the sheet combined with its waterproofing qualities prevents the cracking and disintegration normally attendant with the rigid stucco or plaster covering used commonly in relatively cheap exterior surfacing.

For temporary structures a material of this type is particularly adapted for use where an attractive siding is desired to take the place of stucco, metal or wood. While perhaps not as permanent as wood or sometimes of stucco, it will nevertheless endure the ravages of the elements for considerable period and the cheapness of the material and its application to a surface makes it very attractive for innumerable types of construction.

I claim as my invention:

1. A process for producing a waterproof sheeted material, consisting in passing the sheet through a waterproof saturant and subjecting the applied coating to the roughening effect of a finely divided air blast to set the coating and produce a denticulated surface, applying coarse surfacing material to the roughened coating and imposing a cementitious covering thereon.

2. A waterproof sheet, consisting of a felted fibrous base saturated and coated with a waterproofing substance, one surface of the sheet having irregular furrows and raised portions and having a coarse granular surfacing applied thereto.

3. A waterproof sheet, consisting of a felted fibrous base saturated and coated with a waterproofing substance, the coating substance having irregular furrows and ridged portions on one surface and covered with a coarse granular surfacing material and a cementitious coating.

4. A process for producing a waterproof sheeted material, consisting in saturating and coating a sheet with a waterproofing substance, passing the coated sheet through a roughening operation to cause the coated substance to form an irregular furrowed and ridged denticulated surface, applying a surfacing material to the roughened irregular surface of the sheet, and rolling said surfacing material to produce a substantially flat surface.

5. A process for producing a waterproof sheeted material, consisting in passing the sheet through a waterproof saturant and subjecting the applied coating to the roughening effect of a finely divided air blast to set the coating and produce a denticulated surface, applying coarse surfacing material to the roughened coating and imposing a cementitious covering thereon.

WILLIAM T. HOFMANN.